US012572418B2

(12) United States Patent
Chang et al.

(10) Patent No.: US 12,572,418 B2
(45) Date of Patent: Mar. 10, 2026

(54) MACHINE-LEARNING-BASED SYSTEM HEALTH MONITORING OF A MEMORY DEVICE

(71) Applicant: Micron Technology, Inc., Boise, ID (US)

(72) Inventors: Li-Te Chang, San Jose, CA (US); Murong Lang, San Jose, CA (US); Wenyen Chang, San Jose, CA (US); Wei Wang, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/788,635

(22) Filed: Jul. 30, 2024

(65) Prior Publication Data

US 2026/0037372 A1 Feb. 5, 2026

(51) Int. Cl.
*G06F 11/10* (2006.01)

(52) U.S. Cl.
CPC ...... *G06F 11/1068* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 11,430,530 | B2 * | 8/2022 | Zhang | G11C 16/26 |
| 2022/0108758 | A1 * | 4/2022 | Sheperek | G11C 16/26 |
| 2022/0189545 | A1 * | 6/2022 | Muchherla | G11C 16/0483 |
| 2022/0199187 | A1 * | 6/2022 | Rayaprolu | G11C 16/349 |
| 2023/0176765 | A1 * | 6/2023 | Wang | G06F 3/0679 |
| 2023/0395170 | A1 * | 12/2023 | Rayaprolu | G11C 16/3427 |
| 2024/0045595 | A1 * | 2/2024 | Chang | G11C 16/3495 |

OTHER PUBLICATIONS

R. Ma, F. Wu, M. Zhang, Z. Lu, J. Wan and C. Xie, "RBER-Aware Lifetime Prediction Scheme for 3D-TLC NAND Flash Memory," in IEEE Access, vol. 7, pp. 44696-44708, 2019, (Year: 2019).*

* cited by examiner

*Primary Examiner* — Daniel F. McMahon
(74) *Attorney, Agent, or Firm* — Lowenstein Sandler LLP

(57) ABSTRACT

A system includes a memory device comprising multiple dies and a processing device coupled to the memory device. The processing device causes a health scan to be performed on a block family of the multiple dies. The processing device updates, for each read sample taken during the health scan, an assignment to a voltage offset bin of a plurality of voltage offset bins. The processing device provides the updated assignments to the plurality of voltage offset bins to a machine learning trigger rate (TR) model. The processing device receives, from the machine learning TR model, a code word error rate (CWER) distribution of the memory device. In response to determining that a TR margin value associated with the CWER distribution does not satisfy a threshold value, the processing device causes a data associated with the block family to be refreshed.

20 Claims, 12 Drawing Sheets

200

Provide Predetermined
Component CWER Distribution(s)
210

Provide System-Level Voltage
Offset Bins (e.g., Histogram)  220

Execute ML TR Model  230

System-Level CWER Distribution  240

Predict TR Margin from CWER Distribution
250

Trigger bin refresh in response to TR-Margin
< Threshold Value 260

600

700

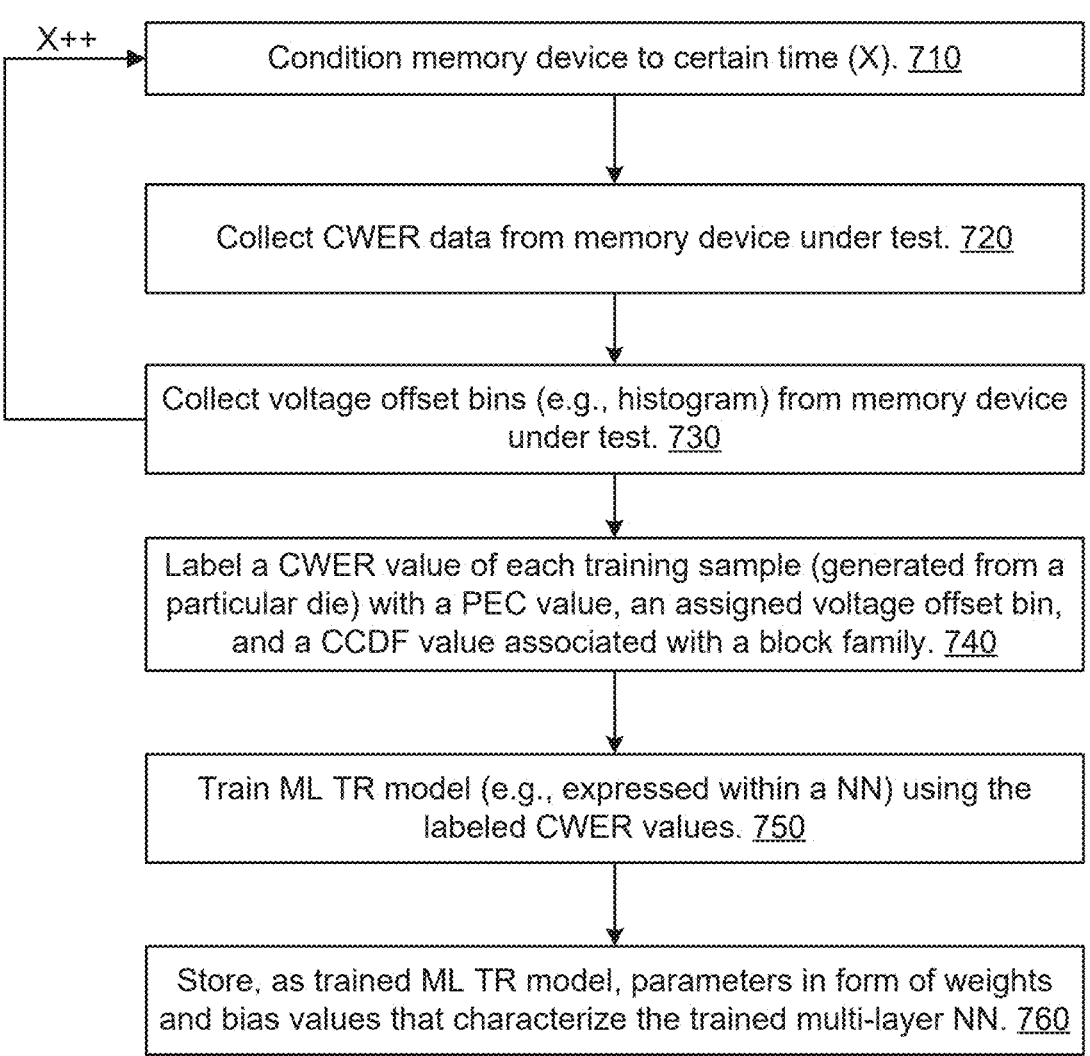

X++

Condition memory device to certain time (X). 710

Collect CWER data from memory device under test. 720

Collect voltage offset bins (e.g., histogram) from memory device under test. 730

Label a CWER value of each training sample (generated from a particular die) with a PEC value, an assigned voltage offset bin, and a CCDF value associated with a block family. 740

Train ML TR model (e.g., expressed within a NN) using the labeled CWER values. 750

Store, as trained ML TR model, parameters in form of weights and bias values that characterize the trained multi-layer NN. 760

MACHINE-LEARNING-BASED SYSTEM HEALTH MONITORING OF A MEMORY DEVICE

TECHNICAL FIELD

Embodiments of the disclosure relate generally to memory sub-systems, and more specifically, to machine-learning-based system health monitoring of a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 7 is a flow diagram of an example method of memory device-level testing to generate device-level data and performing supervised learning of the ML TR model in accordance with some embodiments.

DETAILED DESCRIPTION

Figure 1A:
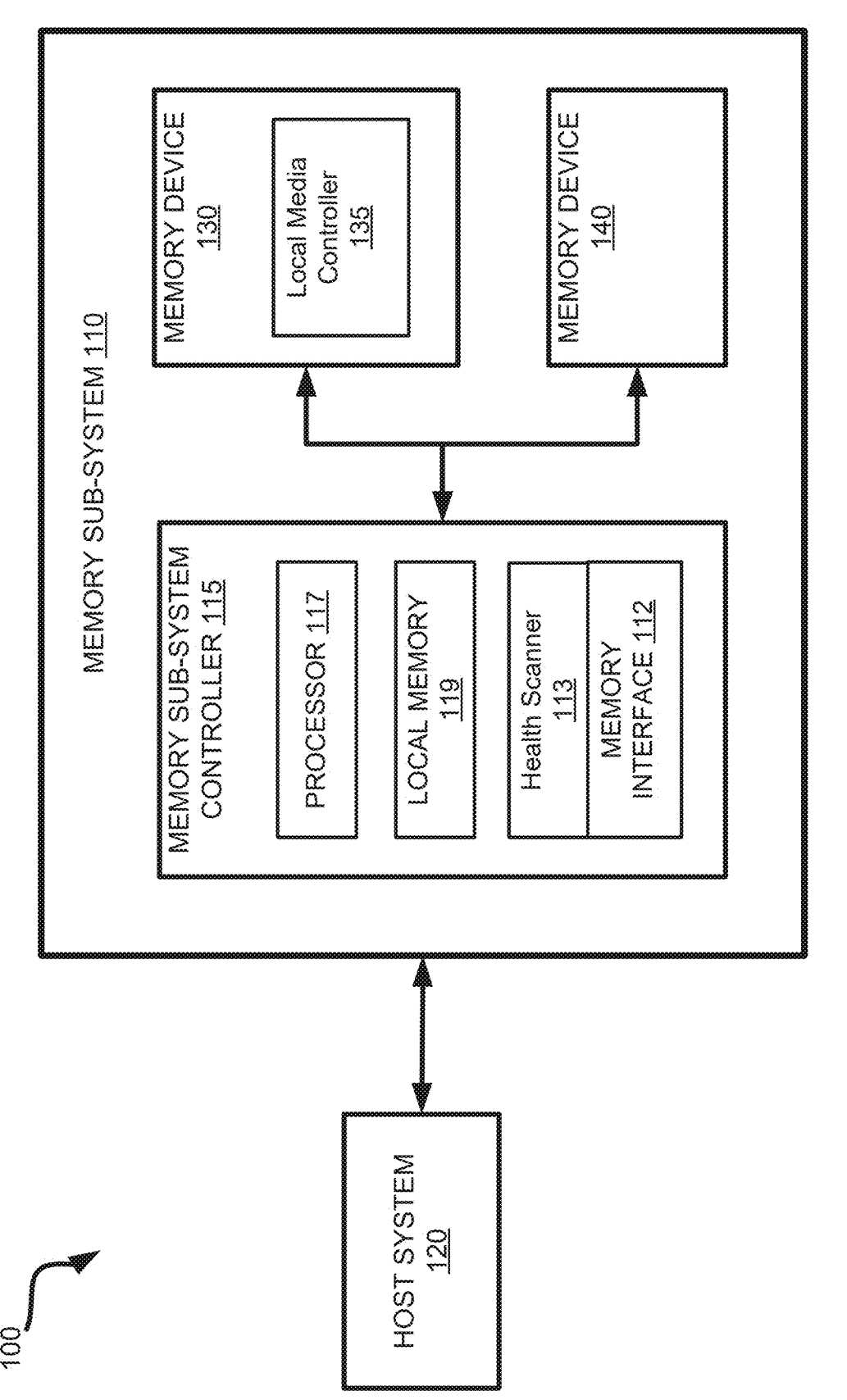
FIG. 1A illustrates an example computing system that includes a memory sub-system in accordance with some embodiments.

Aspects of the present disclosure are directed at machine-learning-based system health monitoring of a memory device according to some embodiments. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high-density, non-volatile memory devices where retention of data is desired when no power is supplied to the memory device. For example, NAND memory, such as 3D flash NAND memory, offers storage in the form of compact, high-density configurations. A non-volatile memory device is a package of one or more memory dies, each including one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can include multiple cells arranged in a two-dimensional or a three-dimensional grid. Memory cells are formed onto a silicon wafer in an array of columns and rows. A data block hereinafter refers to a unit of the memory device used to store data and can include a group of memory cells, a wordline group, a wordline, or individual memory cells. Each data block can include a number of sub-blocks, where each sub-block is defined by a set of associated pillars (e.g., one or more vertical conductive traces) extending from a shared bitline. Memory pages (also referred to herein as "pages") store one or more bits of binary data corresponding to data received from the host system. To achieve high density, a string of memory cells in a non-volatile memory device can be constructed to include a number of memory cells at least partially surround a pillar of channel material. The memory cells can be coupled to access lines, which are commonly referred to as "word-lines," often fabricated in common with the memory cells, so as to form an array of strings in a block of memory. The compact nature of certain non-volatile memory devices, such as 3D flash NAND memory, means wordlines are common to many memory cells within a block of memory.

In programming memory, memory cells can generally be programmed as single-level cells (SLC) or multiple-level cells (MLC). Thus, data states may be associated with certain logical levels of multi-cell memory such as L0, L1, L2, and so forth. Single-level cells can use a single memory cell to represent one digit (e.g., bit) of data. Multiple-level cells use more than two Vt ranges, where each Vt range indicates a different data state (or logical level). So, for example, four-level MLC can store two bits. Similarly, eight-level MLC (referred to as TLC) can represent a bit pattern of three bits, including a first digit, e.g., a least significant bit (LSB) or lower page (LP) data; a second digit, e.g., upper page (UP) data; and a third digit, e.g., a most significant bit (MSB) or extra page (XP) data. Similarly, sixteen-level MLC (typically referred to as QLC) can represent a bit pattern of four bits, and 32-level MLC (typically referred to as PLC) can represent a bit pattern of five bits. Programming MLC memory can be performed using more than one programming pass and moving MLC-based data between memory locations can be referred to as folding the data due to the multiple programming passes employed to obtain the threshold voltage levels that depict the desired logical level (e.g., data states) of the moved data. A window margin (e.g., a certain number of volts) such as a dead space can separate adjacent Vt ranges to facilitate differentiating between data states. Multiple-level cells can take advantage of the analog nature of traditional non-volatile memory cells by assigning a bit pattern to a specific Vt range.

Because of the phenomenon known as slow charge loss ("SCL"), the threshold voltage of a memory cell changes in time as the electric charge of the cell is degrading, which is referred to as "temporal voltage shift" (since the degrading electric charge causes the voltage distributions to shift along the voltage axis towards lower voltage levels). Temporal voltage shift (TVS) herein shall refer to a change in the measured voltage of cells as a function of time. Temporal voltage shift can include different components such as intrinsic charge loss, system charge loss, quick charge loss, and the like. Memory formed from certain NAND technologies generally exhibits more TVS than floating gate NAND. TVS is generally increased by program erase cycles (PEC), higher temperatures, and higher program voltages. TVS shows significant die-to-die variation. In memory that exhibits TVS, the threshold voltage is changing rapidly at first (immediately after the memory cell was programmed), and then slows down in an approximately logarithmic linear fashion with respect to the time elapsed since the cell programming event. If not mitigated, the temporal voltage shift caused by the slow charge loss can result in the increased bit error rate in read operations.

Temporal voltage shift can be mitigated by implementing a memory sub-system that employs block family based error avoidance strategies, thus significantly improving the bit error rate exhibited by the memory sub-system. The temporal voltage shift can be selectively tracked for a programmed set of memory cells grouped by block families. Appropriate voltage "read level offsets," which are based on block affiliation with a certain block family, are applied to the base read levels to perform read operations. "Block" herein shall refer to a set of contiguous or non-contiguous memory pages. An example of "block" is "erasable block," which is the minimal erasable unit of memory, while "page" is a minimal writable unit of memory. Each page includes of a set of memory cells. "Block family" (or "BF") herein shall refer to a possibly noncontiguous set of memory cells that have been programmed within a specified time window and a specified temperature window, and thus are expected to exhibit similar or correlated changes in their respective data state metrics. A block family can be made with any granularity, containing only whole codewords, whole pages, whole super pages, or whole superblocks, or any combination of these granularities.

"Read level" herein shall refer to a voltage position. Read levels are numbered in increasing voltage from L1 through $2^n$, wherein n is the number of bits that can be stored in the cell. "Read level value" herein shall refer to a voltage or DAC value representing a voltage that that is applied to the read element (often, the control gate for a NAND cell) for purposes of reading that cell. "Read level offset" herein shall refer to a component of the equation that determines the read level value. "Calibration" herein shall refer to altering a read level value (possibly by adjusting a read level offset or read level base) to better match the ideal read levels for a read or set of reads.

"Bin" (or "voltage bin" or "voltage offset bin") herein shall refer to a set of read level offsets that are applied to a set of data. The bin offsets are read level offsets that affect the read level for block families within the bin. An old or older bin is one where the read level offsets are directed at data that was written at a relatively early time. A young or younger bin is one where the read level offsets are directed at data written relatively recently. "Bin selection" or "bin assignment" herein shall refer to the process by which the memory device selects which bin to use for a given read at a particular memory block. A "bin histogram" of voltage offset bins can be maintained that tracks which blocks are currently assigned to which voltage offset bin and can be updated over time.

A memory storage sub-system can address high-temperature data retention trigger rate (HTDR-TR) risk related to triggering data refresh operations (e.g., writing data to other memory cells to refresh that data) or to other data retention issues due to high temperature exposure of a memory device of a memory sub-system. In NAND memory, the term "high temperature data retention trigger rate" (HTDR-TR) refers to the rate at which the retention of data stored in the NAND memory degrades when exposed to high temperatures. As was discussed, data retention in NAND memory can be affected by various factors, and high temperatures can accelerate the degradation of stored data. Over time, if a read bit error rate (RBER) starts to increase to a degree that impacts throughput or input-output operations per second (IOPS), then a refresh of the data is performed by reprogramming (e.g., folding if multi-level) the data to a new block (or other memory unit) so that the current block can be erased.

In such a memory sub-system, component (e.g., die-level) data collection and qualification processes cannot exactly mimic system-level usage due to process and setup limitations, particularly as many memory sub-systems now include hundreds of dies. The component quality criteria can be designed with worse-case conditions plus a margin for each corner case, resulting in a sub-optimal setting for the system. System TR is a combination result from a group of dies and the read levels are not always the optimal to all dies as the system coordinates management of these read levels. Therefore, component or die-level TR cannot be directly used, in a general sense, for system management and requirements prediction. Further, the system cannot easily, within an early timeline of a system life, determine if there are system-level data retention issues based on RBER rates of individual dies. If the system has to wait more time to identify such data retention issues with the NAND media, it becomes more costly to fix these data retention issues.

Median scans can perform a data refresh if a single page scan detects a bit error count (BEC) is above the designated threshold. To perform a data refresh for multi-level cells is to fold the block of data, as discussed previously by employing multiple programming passes. Performing too many data refreshes incurs performance penalties and multiplies program/erase count cycles (PEC), which causes additional wear and stress that can prematurely age the memory device. These media scans may also have limited sampling due to not being able to have constant background scans going on. But, as was discussed, currently there is no way of knowing, using these limited background scans that generate a limited number of read samples, that the health scanning results reflects the health of the entire memory device. Additional limitations to these typical background health scans include being sensitive to high BEC variation, use of die-level matrices not easily adapting to system workloads or different system conditions, and can lead to excessive folding, which can hurt quality of service (QOS) and endurance.

Aspects of the present disclosure address the above and other deficiencies by employing a component-to-system machine learning (ML) TR model that is able to take voltage offset bins, which are assigned to each read sample of a health scan performed over time, and predict a corresponding code word error rate (CWER) distribution for the memory device. The CWER distribution can be understood as a distribution of BEC for the memory device over time. In some embodiments, the CWER is generated as a complementary cumulative distribution function (CCDF), which can be used to describe the tail distribution of a variable. In the context of data retention rates in NAND memory, the CCDF can be particularly useful for understanding the reliability and failure characteristics of a memory device over time. For example, a TR margin can be measured as a distance from the CWER distribution at a particular CCDF value to a hard limit (HL) of a low-density parity-check (LDPC) decoder of the memory sub-system controller, e.g., processing device (see FIG. 3C). By measuring, after read scan updates to voltage offset bins, a TR margin value of the CWER distribution and comparing the TR margin value with a threshold value, the memory sub-system system can determine whether to refresh data of a particular block family, block, or page depending on granularity of background health scans, memory device, and application.

In some embodiments, the system (e.g., controller) causes a health scan to be performed on a block family of a plurality of block families of a memory device that includes a plurality of dies. The system can then update, for each read sample taken during the health scan of the block family, an assignment of a voltage offset bin of a plurality of voltage offset bins. In some embodiments, each respective voltage offset bin of the plurality of voltage offset bins can also be associated with a die family of the plurality of dies (see FIG. 5).

In various embodiments, these voltage offset bins are tracked within the previously mentioned bin histogram. More specifically, coarse read calibration may be performed using a set of predefined read levels, where each voltage offset bin points to a set of read offsets associated with voltage levels, e.g., L0, L1, . . . . L7, which were discussed. Because the memory device having multiple dies and blocks of data with different SCL characteristics, the system (e.g., controller) can group similar blocks together (e.g., by time and temperature) in a block family and apply a closest read voltage offset or selected bin for that block family. While a histogram is referenced herein, it should be apparent that other data structures can be employed by which to track voltage offset bin assignments to blocks, block families, die families, and the like over time.

In some embodiments, the system further provides the updated assignments to the plurality of voltage offset bins into a ML TR model, as was discussed. The system can then receive, from the ML TR model, a CWER distribution of the memory device. In some embodiments, in response to determining that the TR margin value associated with the CWER distribution does not satisfy a threshold value, the system causes a data associated with the block family to be refreshed. In other embodiments, in response to determining that a TR margin value associated with the CWER distribution at least satisfies a threshold value, the system executes the TR ML model with a set of updated assignments of the read samples to the plurality of voltage offset bins for the block family, thus avoiding premature data refresh.

Advantages of the present disclosure include, but are not limited to, injecting ML-based intelligence into correlating die-level time-to-fail (TTF) data with varying voltage offset bins for the entire memory device to train a particular ML TR model. The trained ML TR model can then be employed to better predict, from a system-level perspective, whether the data for a particular block family should be refreshed. By employing the trained ML TR model in on-going data refresh operations, based on updated assigned to voltage offset bins for a particular block family (or other unit of memory), system-level data retention issues can be identified earlier while avoiding unnecessary data refresh operations that would otherwise impact performance and lifespan of the memory device. Further, the disclosed embodiments can reduce development efforts when the ML TR model is able to predict comparable results to save engineering resources. For example, the disclosed embodiments can significantly save system resources by replacing other background management, such as media scans (related to detecting SCL) and partial read disturb detection (pRDD)-based scanning. Other advantages will be apparent based on the additional details provided herein.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, the memory sub-system 110 includes a memory interface component 112. Memory interface component 112 is responsible for handling interactions of memory sub-system controller 115 with the memory devices of memory sub-system 110, such as memory device 130. For example, memory interface component 112 can send memory access commands corresponding to requests received from host system 120 to memory device 130, such as program commands, read commands, or other commands. In addition, memory interface component 112 can receive data from the memory device 130, such as data retrieved in response to a read command or a confirmation that a program command was successfully performed. In some embodiments, the memory sub-system controller 115 includes at least a portion of the memory interface 112. For example, the memory sub-system controller 115 can include a processor 117 (processing device) configured to execute instructions stored in local memory 119 for performing the operations described herein. In some embodiments, the memory interface component 112 is part of the host system 110, an application, or an operating system.

In one embodiment, the memory sub-system controller 115 includes a memory device health scanner 113 that can, in conjunction with the memory interface 112, oversee, control, and/or manage read access operations, such as read operations and scan read operations, performed on a non-volatile memory device, such as memory device 130, of the memory sub-system 110. In various embodiments, the memory sub-system controller 115 includes at least a portion of the health scanner 113 and is configured to perform the functionality described herein, particularly in relation to performing the machine-learning-based system health monitoring of a memory device 130. In such embodiments, the health scanner 113 can be implemented using hardware or as firmware, stored on in the local memory 119 and/or in the memory device 130, executed by the health scanner 113 to perform the operations described herein. In some embodiments, one or more operations performed by the health scanner 113 are performed by the local media controller 135 or other logic located on-board the memory device 130.

Figure 1B:
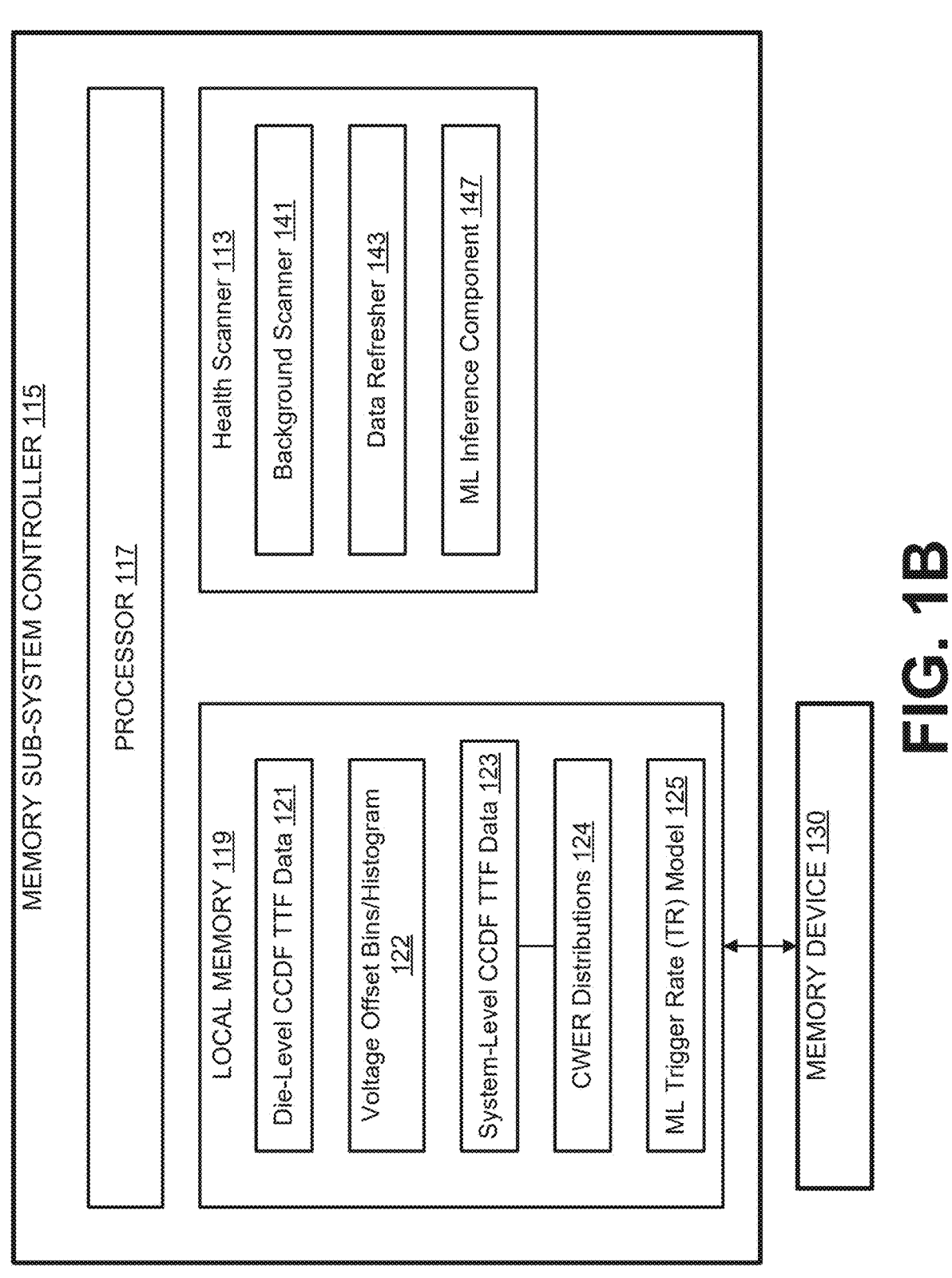
FIG. 1B is an example memory sub-system controller of the computing system that is configured to direct training a machine learning (ML) trigger rate (TR) model for use in health scan monitoring in accordance with some embodiments.
Figure 1C:
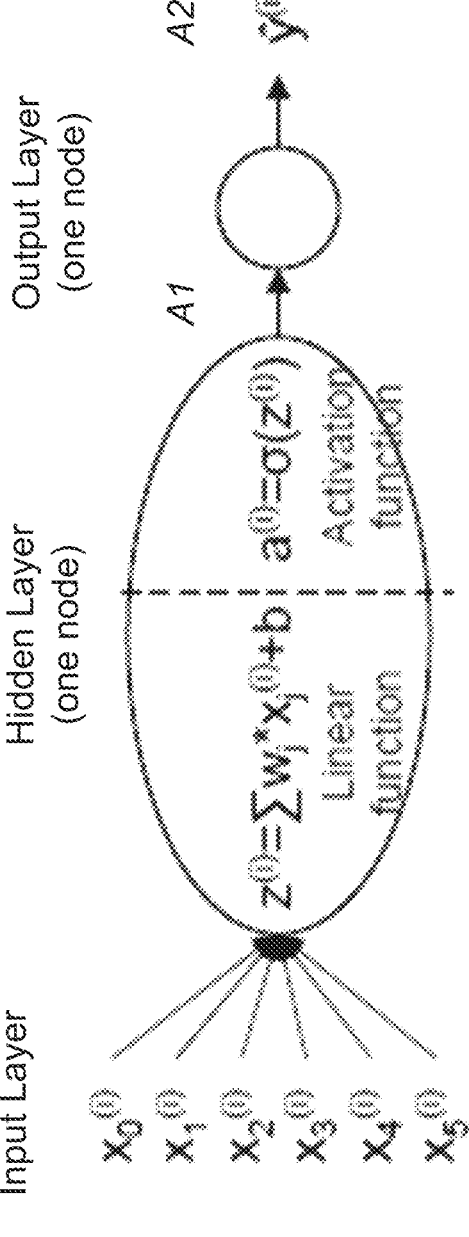
FIG. 1C is an example neural network that is useable to train the ML TR model in accordance with some embodiments.

FIG. 1B is an example memory sub-system controller 115 of the computing system 100 that is configured to direct training a machine learning (ML) trigger rate (TR) model for use in health scan monitoring in accordance with some embodiments. FIG. 1C is an example neural network that is useable to train the ML TR model according to some embodiments. In some embodiments, the local memory 119 (and/or the memory device 130) stores data used to train and use the ML TR model. For example, the local memory 119 can include volatile memory, such as static random access memory (SRAM), dynamic RAM (DRAM), and/or tightly-coupled memory (TCM). Depending on the volume of this data, at least some of the data can be stored in the memory device 130, which can also provide non-volatile backup storage to the local memory 119.

In various embodiments, the data used to train (or that results from the trained) TR ML model 125 can include component-level CCDF TTF data 121, voltage offset bins 122 (which can be in a histogram form), system-level CCDF TTF data 123, and related system-level CWER distributions 124. In some embodiments, the health scanner 113 includes, but is not limited to, a background scanner 141 for performing background health scans, a data refresher 143 to direct data refresh when a background health scan finds a unit of memory (e.g., related to a block family (BF) and/or a die family (DF)) that meets certain BEC or other aging criteria, and a ML inference component 147.

In embodiments, a neural network (NN) is executed to train the ML TR model 125 with particular weights and bias values, as will be discussed in more detail, which emulate convoluted system TR management, such as BF, DF, and overhead processing, while limiting the amount of background sampling during read scans. The health scanner can group blocks together based on, for example, being programmed to one or more dies around a same time and temperature, which will be discussed in more detail with reference to FIG. 5.

In embodiments, the ML TR model 125 is trained based on die (e.g., memory component) and sub-system inputs received from the memory sub-system controller. In some embodiments, the health scanner 113 labels read samples, to generate labeled inputs, and executes a multi-layer neural network 155, such as illustrated in FIG. 1C, using the labeled inputs. The health scanner 113 can then store a plurality of weights and bias values, after some iterations of training the multi-layer neural network 155, as the ML TR model 125. For example, the weights and bias values can be associated with a linear function and an activation function of a hidden layer and of an output layer of the trained multi-layer neural network 155. While a two-layer NN is illustrated in FIG. 1C, additional hidden layers can be employed or different types of NN are envisioned, and thus, the multi-layer neural network 155 is illustrated only by way of example. Training the ML TR model 125 will be discussed in more detail with reference to FIGS. 6-7.

Figure 2:
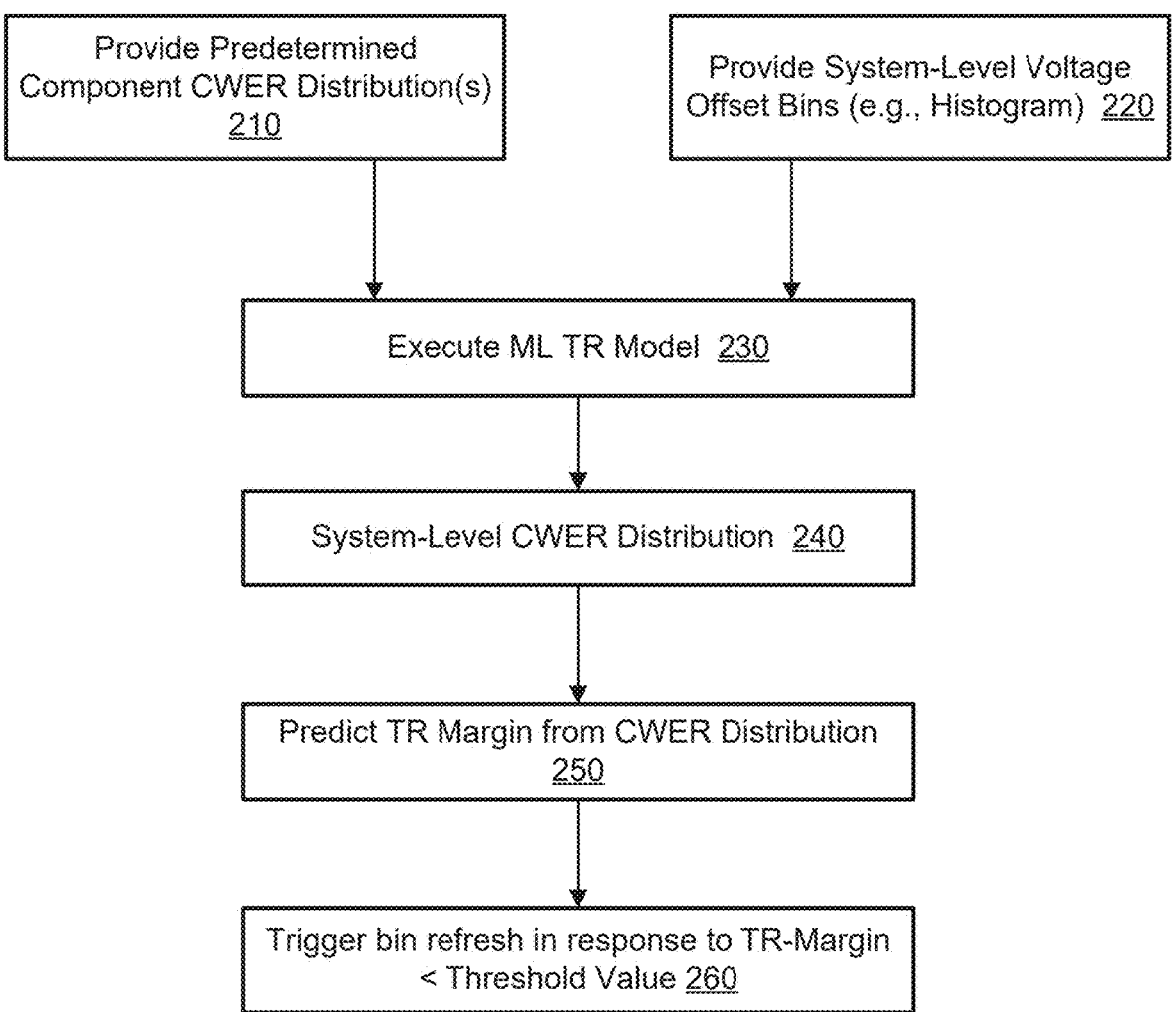
FIG. 2 is a flow diagram of an example method of employing ML-based system health monitoring in accordance with various embodiments.

With continued reference to FIG. 1, FIG. 2 is a flow diagram of an example method 200 of employing ML-based system health monitoring in accordance with various embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the health scanner 113 with access to the local memory 119 and the memory device 130 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3B:
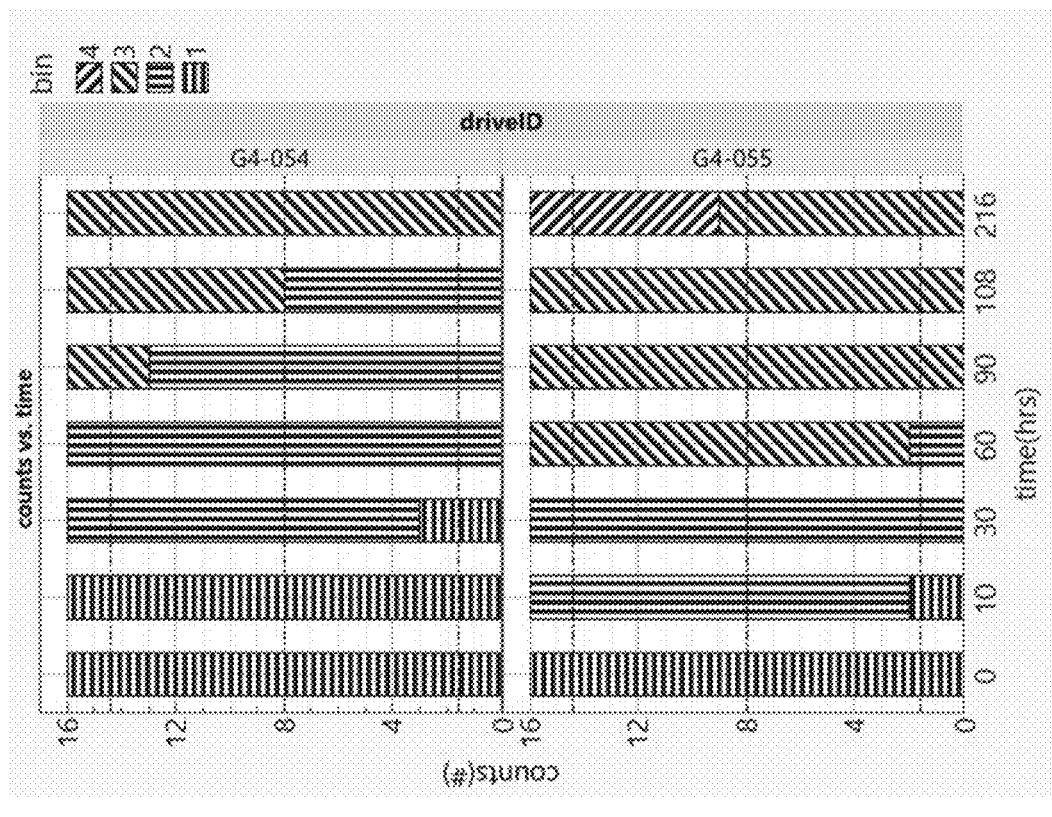
FIG. 3B is a bar graph depiction of a histogram of voltage offset bins for block families of the memory device in accordance with some embodiments.
Figure 3A:
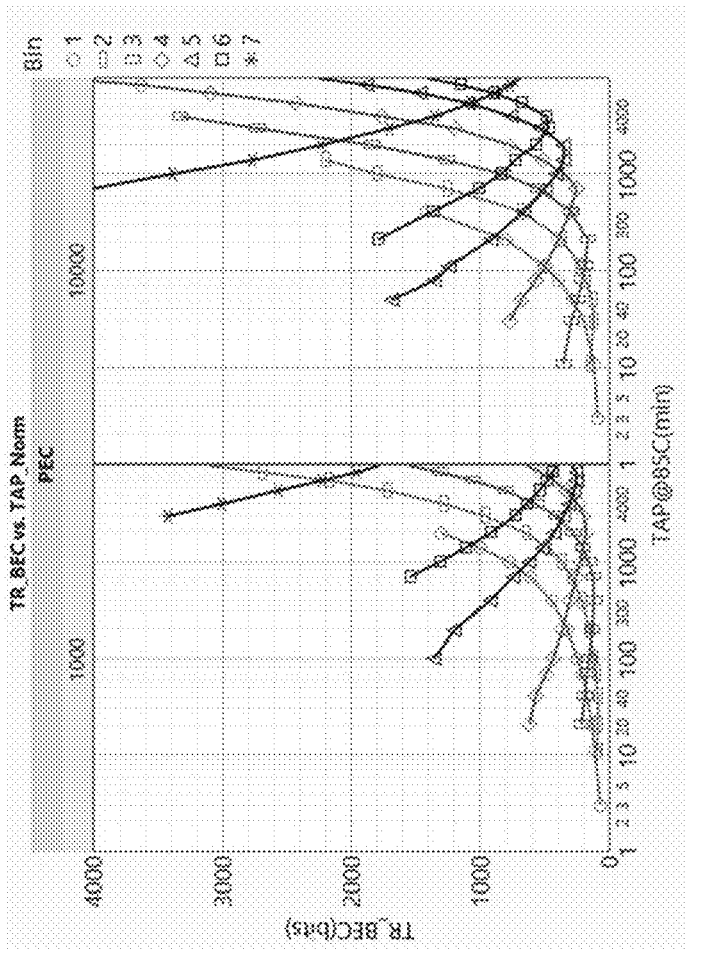
FIG. 3A is a graph of an example component code word error rate (CWER) profile of a die of a memory device in accordance with some embodiments.

At operation 210, the processing logic provides, to the trained ML model 125, predetermined component CWER distribution(s) into the ML TR model 125. More specifically, FIG. 3A is a graph of an example component code word error rate (CWER) profile of a die of the memory device 130 in accordance with some embodiments. As illustrated, the y-axis of the graph is TR_BEC (trigger rate bit error count), the x-axis is time after program (TAP), and each plot is a different voltage offset bin, each of which can be quantified within a histogram in some embodiments (see FIG. 3B). In embodiments, the values of these die-level CWER plots are stored in the die-level CCDF TTF data 121 and can be considered to be CCDF plots, which can be used to describe the tail distribution of a variable. In the context of data retention rates in NAND memory, these CCDF plots can be particularly useful for understanding the reliability and failure characteristics of each memory die over time.

At operation 220, the processing logic provides, to the ML TR model 125, predetermined system-level voltage offset bins (which can be instantiated as a histogram in at least one embodiment) into the ML TR model 125. More specifically, FIG. 3B is a bar graph depiction of a histogram of voltage offset bins for block families. The histogram is illustrated with four different bin values, each associated with a voltage offset bin. Each voltage offset bin can correspond to a set of voltage offsets for different read levels, e.g., L0, L1, . . . L7, or the like. Thus, voltage offset bins might also correlate to ranges of program/erase (P/E) cycles, error rates, and/or retention times, as a given block family may have in common. Other data structures besides a histogram may also be configured to convey this information by way of voltage offset bins.

With specific reference to the histogram of voltage offset bins in FIG. 3B, the x-axis can represent the different voltage offset bins or categories and the y-axis can represent the frequency or count of blocks falling into each voltage offset bin. Further, the x-axis illustrates time after program of data in each block. In this way, assignments of blocks to a voltage offset bin tend to move into higher bins (indicative of aging data) over time, e.g., as the health scan progresses. In this way, higher bin values may be indicative of higher RBER and potentially getting closer to needing a data refresh.

At operation 230, the processing logic executes the trained machine learning (ML) TR model using, as inputs, the most-recent updates reflected in the bin assignments within the bin histogram received at operation 220 and the component CWER distributions received at operation 210.

Figure 3C:
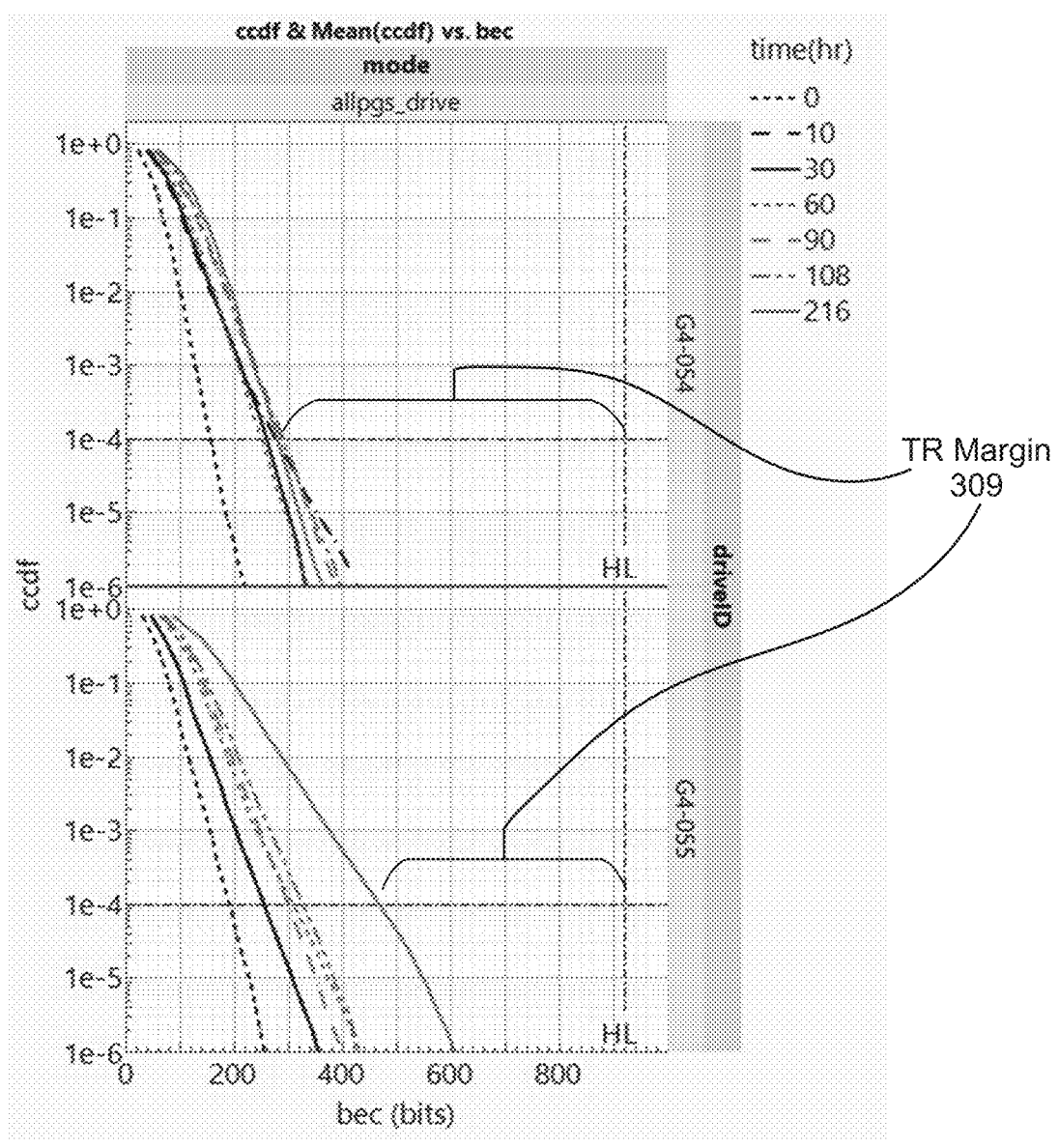
FIG. 3C is a graph of an example memory device-level CWER distribution output from the trained ML TR model based on a correlation between the CWER profile of a die and the voltage offset bins of the histogram in accordance with some embodiments.

At operation 240, the processing logic outputs, from the ML TR model, a system-level CWER distribution, which is statistical distribution of error rate across the plurality of dies of the memory device 130. FIG. 3C is a graph of an example memory device-level CWER distribution output from the trained ML TR model based on a correlation between the CWER profile of a die and the voltage offset bins of the histogram in accordance with some embodiments. In embodiments, the CWER distribution includes a plot of a complementary cumulative distribution function (CCDF) of a bit error count (BEC) of the plurality of dies of the memory device 130. In embodiments, therefore, the CCDF of the BEC is predictive of a likelihood of data retention past a particular time after program of the data stored the memory device.

More specifically, with reference to FIG. 3C, the different plot lines are associated with a different time after program, e.g., different data retention time. As illustrated, the y-axis represents a range of CCDF values and the x-axis represents bit error count (BEC) values. The CCDF value of a variable X (which here can represent a tail of BEC probability distribution) can be defined as: $CCDF(x)=P(X>x)$. This function gives the probability that the variable X (e.g., BEC) takes on a value greater than x. Thus, the CCDF value shows how likely it is for the variable X to exceed a certain threshold value.

At operation 250, the processing logic predicts a TR margin 309 from the CWER distribution as a distance from the CWER distribution at a particular CCDF value to a hard limit (HL) of a low-density parity-check (LDPC) decoder of the processing device. In one embodiment, the TR margin is calculated as 20*log (HL/TR-BEC) with an output value in decibels (dB). For purposes of explanation, and by way of example, presume the particular CCDF value set as the threshold is the 1e-4 (or $1\times10^{-4}$) quantile probability level. Thus, the plot with the highest BEC value at the 1e-4 threshold can define the TR margin, e.g., the distance along the x-axis from that 1e-4 threshold crossover to the hard limit at an extreme end of the x-axis. In some embodiments, the LDPC decoder hard limit value is defined by a class of linear error-correcting codes characterized by a sparse parity-check matrix that the LDPC decoder uses to identify and fix errors in data that is being processed, moved, and stored.

At operation 260, the processing logic triggers a refresh of data associated with a voltage offset bin (e.g., as updated in the bin histogram) that results in a TR margin that does not satisfy a threshold value. In other words, if the TR margin gets too small, the expected BEC at the 1e-4 threshold level is already too high and thus indicative that the data in blocks assigned to impacted bin(s) need to be refreshed. (See FIG. 5 for additional detail of identifying block families that could be individually refreshed.)

Figure 4B:
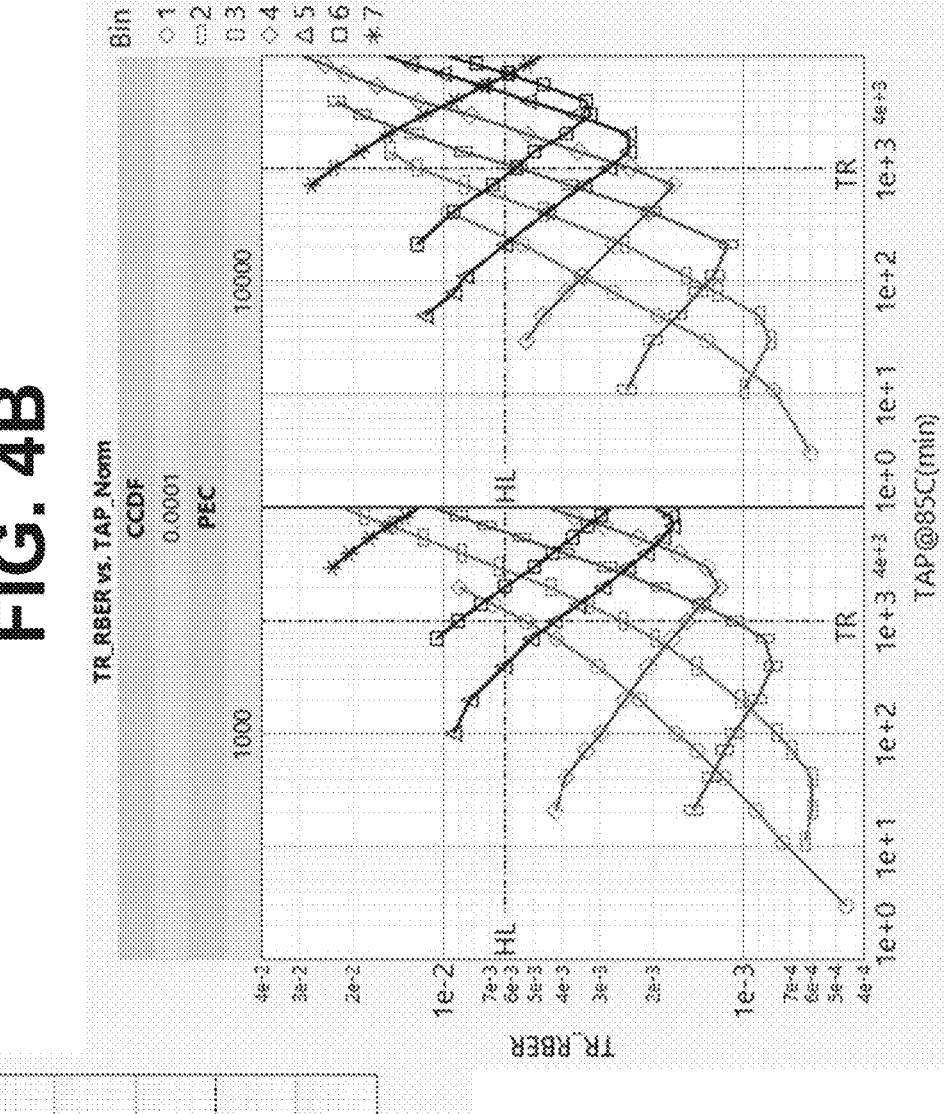
FIG. 4B is a graph illustrating a TR read bit error rate (RBER) versus time after program, comparing beginning of life with end of life, and generated using the survival plot of FIG. 4A in accordance with some embodiments.
Figure 4A:
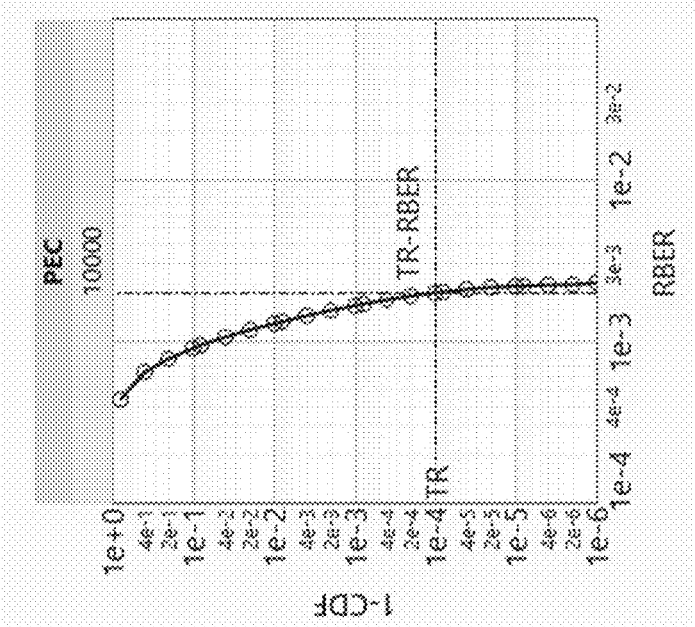
FIG. 4A is a survival plot illustrating a probability of the CWER distribution reaching a particular threshold value in accordance with some embodiments.

FIG. 4A is a survival plot illustrating a probability of the CWER distribution reaching a particular threshold value in accordance with some embodiments. The x-axis can track RBER values while the y-axis can track 1-CDF (or CCDF) values. A trigger rate (TR)-RBER value can be extracted from this survival plot at the 1e-4 threshold level, which was the same threshold used for the TR margin of the CWER distribution plot.

FIG. 4B is a graph illustrating a TR read bit error rate (RBER) versus time after program, comparing beginning of life with end of life, and generated using the survival plot of FIG. 4A in accordance with some embodiments. The plot of FIG. 4B can be generated from volume qualification data (e.g., over 100 or 200 dies) and performing time-to-fail (TTF) analysis employed as a methodology that extracts sufficient scan frequency from each voltage offset bin. This plot illustrates trajectories of TR-RBER along the y-axis versus TAP along the x-axis of various voltage offset bins, which are represented by individual plots on the graph. In at least some embodiments, BFEA TTF data is employed to coherently evaluate TR-RBER and scan cadence. To keep TR-RBER lower than the hard limit of the LDPC decoder, the controller 115 can cause a refresh of block assigned to each voltage offset bin faster than half of TTF, which can be defined as a duration from the beginning of life to a failure, e.g., when the TR-RBER reaches a guard band of the hard limit.

Figure 5:
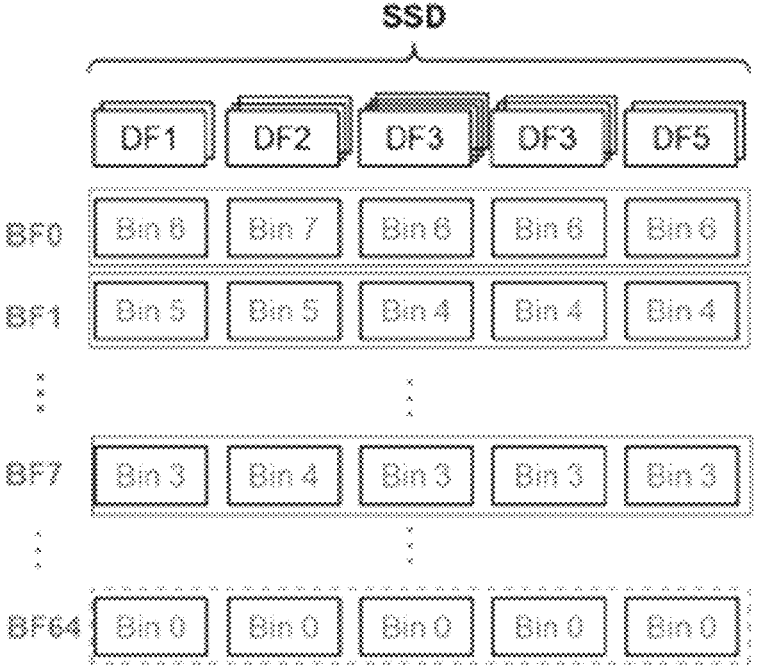
FIG. 5 is a pictorial representation of voltage offset bin distribution that groups voltage offset bins into block families and block families into die families in accordance with some embodiments.

FIG. 5 is a pictorial representation of voltage offset bin distribution that groups voltage offset bins into block families and block families into die families in accordance with some embodiments. As illustrated, block families (BFs) can include a distribution of bins (which are associated with a voltage offset bin) that are simultaneously distributed across multiple dies, e.g., where each voltage offset bin can be associated with a die family (DF). In this way, to correlate the component CWER data to the system CWER data, the controller 115 can consider multiple dies, each assigned to a different voltage offset bin depending on BF assignment. This grouping of block families may be based on blocks of a BF being programmed around the same time and temperature, e.g., within a range of a time period and temperature range. In this way, each BF can be expected to have similar data retention length and read level values. Further, sampling at the BF level can be expected to be more efficient in being representative of the BF as a whole without having to sample all blocks of the block family.

Figure 6:
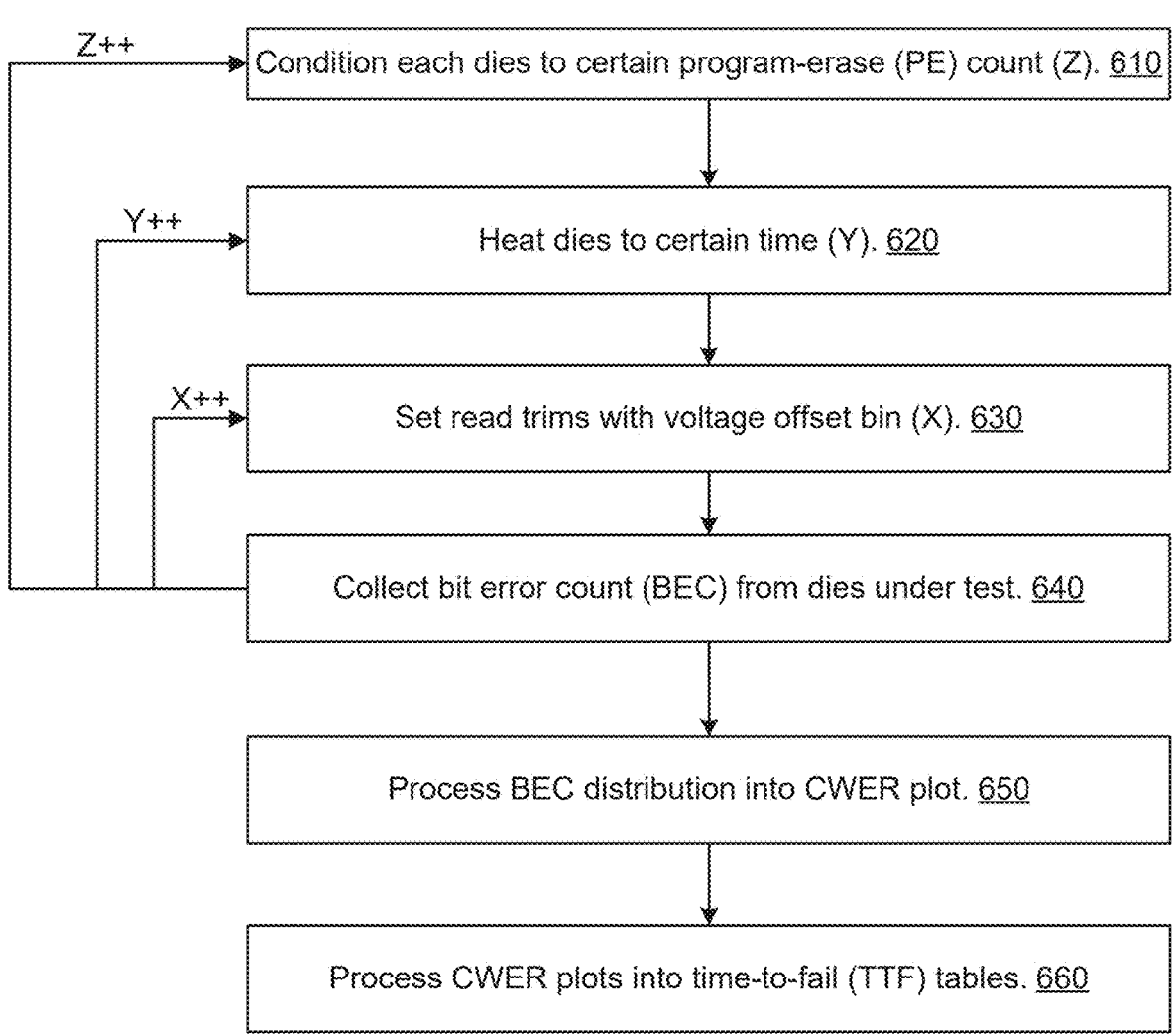
FIG. 6 is a flow diagram of an example method of component testing individual dies of the memory device to generate component-level data for use in training the ML TR model in accordance with some embodiments.

FIG. 6 is a flow diagram of an example method 600 of component testing individual dies of the memory device to generate component-level data for use in training the ML TR model in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the health scanner 113 with access to the local memory 119 and the memory device 130 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In testing the dies and generating data for use in training the ML TR model 125, the controller 115 can categorize NAND lifetime into beginning of life (BOL), middle of life (MOL), and end of life (EOL). In some embodiments, BOL and MOL refer to 10% and 50% of EOL, respectively. In other embodiments, BOL and MOL refers to 15% and 55%, respectively. Other percentages of EOL are envisioned. These BOL, MOL, and EOL constructs may be used throughout this disclosure to provide criteria around assignment read samples to voltage offset bins and generating statistical values that predict when to perform data refresh.

At operation 610, the processing logic conditions the dies of the memory device 130 to certain program-erase (PE) count, indicated as "Z." Thus, to "condition" the dies means to repeatedly erase and program blocks with data. As further PE cycles are incurred, the value of Z can be incremented (Z+) to a particular target Z value.

At operation 620, the processing logic heats dies over time, indicated as "Y." As further die heat cycles are incurred, the value of Y can be incremented (Y+) to a particular target Y value. As heating occurs at higher temperatures, data retention values are accelerated and enables reducing testing time.

At operation 630, the processing logic sets read trims with a voltage offset bins, indicated as "X." For example, read trims can be variations in read levels that may further offset read levels associated with voltage offset bis, depending specific read trims. As further PE cycles and heat cycles progress, iterations of read trim adjustments can also be incremented (X+) to a particular target X, e.g., voltage offset bin. In this way, read trim values can be tracked over time and temperature as additional data indicative of data retention time and aging.

At operation 640, the processing logic collects bit error count (BEC) values from each die of a plurality of dies under test. These BEC values can be correlated over time with, for example, variations in PE cycle counts, temperature at which the dies were being heated, as well as read trim values.

At operation 650, the processing logic processes a BEC distribution (e.g., BEC values taken over iterations that are test-stressing the die) into a CWER plot for each die. Thus, each CWER plot represents an individual component or die of the memory device 130.

At operation 660, the processing logic processes the CWER plots into TTF tables or other data structures storing TTF-based information.

FIG. 7 is a flow diagram of an example method of memory device-level testing to generate device-level data and performing supervised learning of the ML TR model in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the health scanner 113 with access to the local memory 119 and the memory device 130 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic conditions the dies of the memory device 130 to a certain time, indicated as "X." The conditioning can be incremental, such as discussed with reference to FIG. 6, until some target value for X. While the method 600 of FIG. 6 is explained in relation to generating CWER and TTF data for each individual die, the method 700 of FIG. 7 is focused on performing a test on the entire memory device 130 for purposes of collecting and labeling system-level data.

At operation 720, the processing logic collects CWER data from the memory device 130 under test. Collecting CWER data can be performed a die at a time, as discussed with reference to operation 650 (FIG. 6).

At operation 730, the processing logic collects voltage offset bins (e.g., within a histogram) from the memory device 130 under test. These voltage offset bins can be assigned to particular read samples taken during scan tests of the memory device, which can be correlated with blocks, BFs, DFs, or a combination thereof.

At operation 740, the processing logic labels a CWER value of each training read sample (generated from a particular die) with a PEC value, an assigned voltage offset bin, and a CCDF value associated with a block family. This labeling can include labeling a CWER value of each of a plurality of training read samples, generated from each respective die of a plurality of dies, with an erase count (PEC) value, an assigned voltage offset bin, and a complementary cumulative distribution function (CCDF) value associated with the respective block family.

At operation 750, the processing logic trains the ML TR model using the labeled CWER values. The actual training of the ML TR model 125 can be performed offline in a computer external to the memory sub-system 110. Due to the labeling at operation 740, this training of the ML TR model 125 can be considered supervised learning performed on the multi-layer neural network 155 (or other NN-based model). Thus, in some embodiments, during age-testing of the plurality of dies, the processing logic trains the machine learning TR model 125 by correlating a bit error count (BEC) distribution of each of the plurality of dies with the BFEA bin histogram to generate quantiles of the CWER distribution that vary based on time after program.

At operation 760, the processing logic stores, as the trained ML TR model, parameters in the form of weights and bias values that characterize the trained multi-layer neural network 155, which was discussed in relation to FIG. 1C.

In some embodiments, as an extension to the method 700, the processing logic normalizes the plurality of weights and the bias values using a combination of one or more first TR-BEC values associated with lowest BEC percentiles determined without a delay between assigning a voltage offset bin and reading the voltage offset bin and one or more second TR-BEC values associated with delayed BEC percentiles corresponding to reading the voltage offset bin after a delay. The processing logic cannot expect that the system 100 is ideally calibrated due to this delay, but through this normalization procedure, a calibration of the ML TR model 125 is improved to account for the delay.

Figure 8:
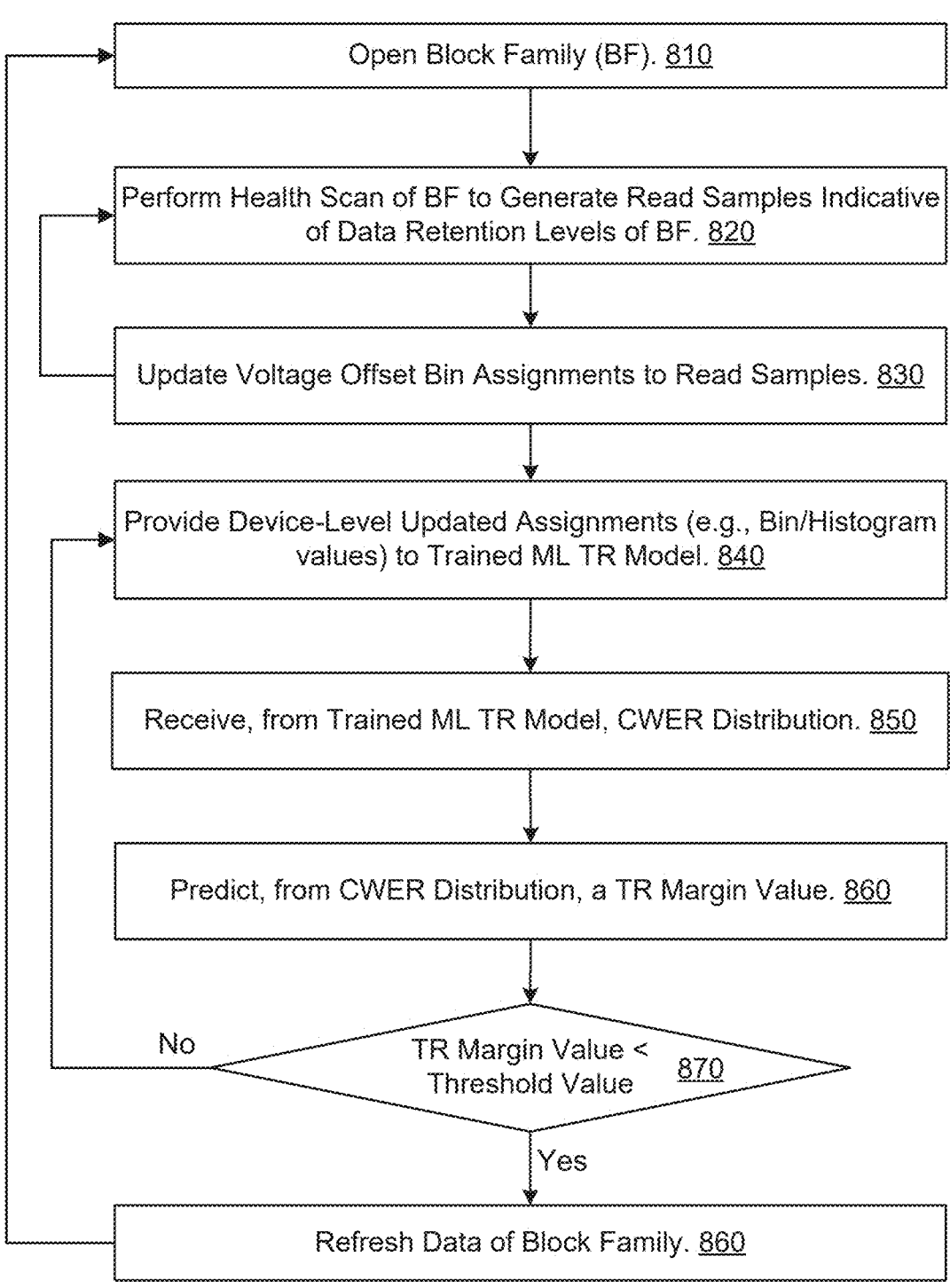
FIG. 8 is a flow diagram of an example method of employing system scan health monitoring of the memory device using the trained ML TR model in according with various embodiments.

FIG. 8 is a flow diagram of an example method 800 of employing system scan health monitoring of the memory device using the trained ML TR model in according with various embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the health scanner 113 with access to the local memory 119 and the memory device 130 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, processing logic opens a block family (BF), e.g., due to the last BF having been closed and additional data being stored to the memory device 130.

At operation 820, the processing logic causes a health scan to be performed on a block family of a plurality of block families of the memory device 130 to generate read samples indicative of data retention levels of the BF. In embodiments, wherein the block family comprises a plurality of blocks residing within one or more dies of the plurality of dies.

At operation 830, the processing logic updates, for each read sample taken during the health scan of the block family, an assignment to a voltage offset bin of a plurality of voltage offset bins. The method 800 can flow back to operation 820 while there are still samples for which to update voltage offset bin assignments. In some embodiments, even after the method 800 flows on to operation 840, operations 820 and 830 may continue to be performed. In embodiments, the updated assignments to the plurality of voltage offset bins are tracked within a bin histogram, as discussed herein.

At operation 840, the processing logic provides the updated assignments to the plurality of voltage offset bins to a machine learning trigger rate (TR) model, e.g., the ML TR model 125.

At operation 850, the processing logic receives, from the machine learning TR model, a code word error rate (CWER) distribution of the memory device.

At operation 860, the processing logic predicts, from the CWER distribution, a TR margin value, as discussed with reference to FIG. 3C.

At operation 870, the processing logic determines whether the TR margin value satisfies a threshold value. In some embodiments, satisfying the threshold value means to be greater than or equal to the threshold value. In embodiments, in response to determining that the TR margin value associated with the CWER distribution satisfies the threshold value, the processing logic executes the machine learning TR model using a new set of updated assignments of read samples to the plurality of voltage offset bins. For example, the method 800 can loop back to operation 840 after additional read samples get updated voltage offset bin assignments at operation 830.

At operation 880, in response to determining that a TR margin value associated with the CWER distribution does not satisfy a threshold value, the processing logic causes a data associated with the block family to be refreshed.

Figure 9:
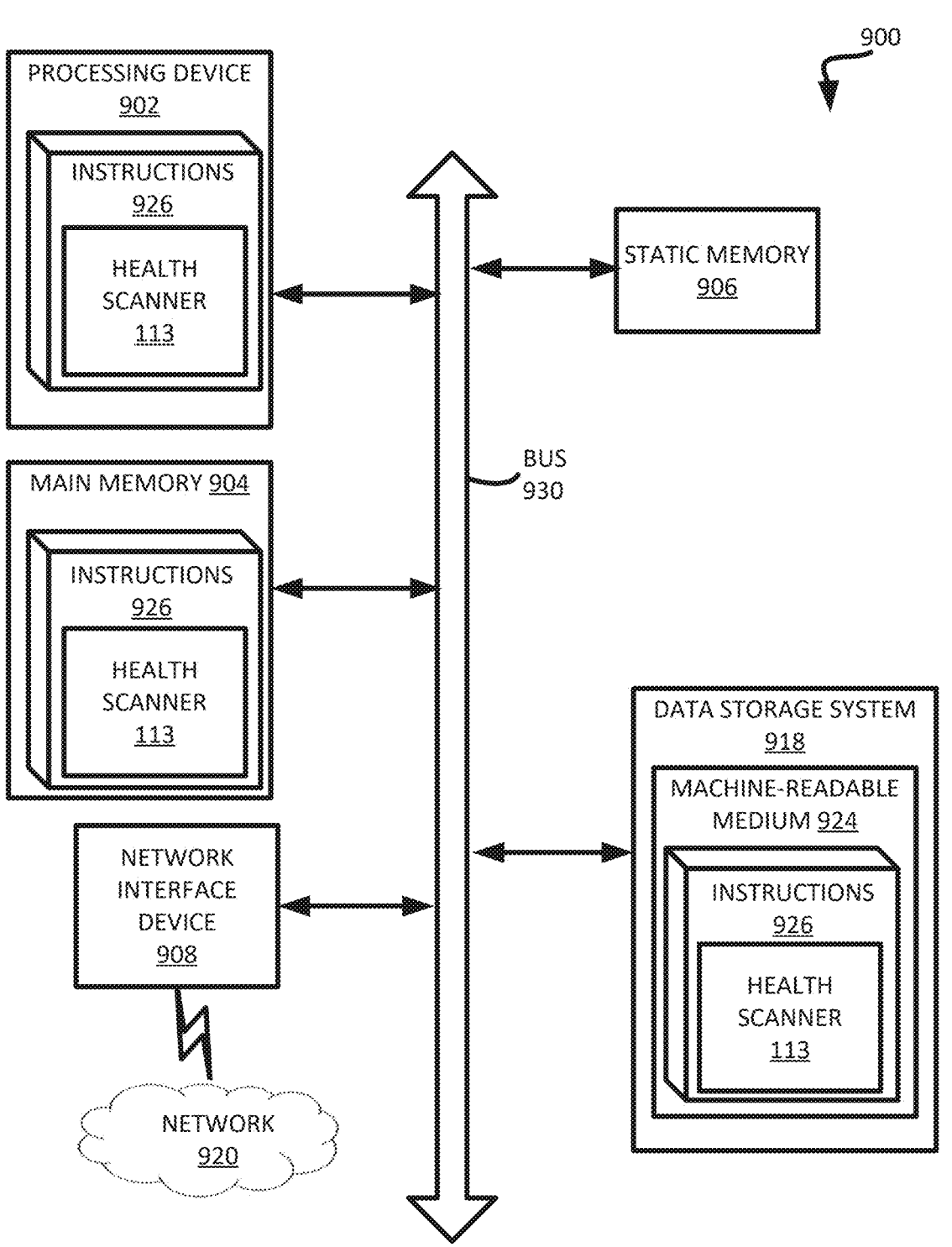
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the health scanner 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium, such as a non-transitory computer-readable storage medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1A.

In one embodiment, the instructions 926 include instructions to implement functionality corresponding to the health scanner 113 of FIG. 1A). While the machine-readable storage medium 924 is shown in an example embodiment to be a single medium, the term "machine-readable storage medium" or "non-transitory computer-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system comprising:
a memory device comprising a plurality of dies; and a processing device coupled to the memory device, the processing device to perform operations comprising:

causing a health scan to be performed on a block family of a plurality of block families of the memory device, wherein the block family comprises a plurality of blocks residing within one or more dies of the plurality of dies;

updating, for each read sample taken during the health scan of the block family, an assignment to a voltage offset bin of a plurality of voltage offset bins;

providing the updated assignments to the plurality of voltage offset bins to a machine learning trigger rate (TR) model;

receiving, from the machine learning TR model, a code word error rate (CWER) distribution of the memory device; and in response to determining that a TR margin value associated with the CWER distribution does not satisfy a threshold value, causing a data associated with the block family to be refreshed.

2. The system of claim 1, wherein the operations further comprise, in response to determining that the TR margin value associated with the CWER distribution satisfies the threshold value, executing the machine learning TR model with a new set of updated assignments of read samples to the plurality of voltage offset bins.

3. The system of claim 1, wherein the CWER distribution comprises a complementary cumulative distribution function (CCDF) of a bit error count of the plurality of dies, and wherein the CCDF of the bit error count is predictive of a likelihood of data retention past a particular time after program of the data.

4. The system of claim 3, wherein the operations further comprise predicting the TR margin value as a distance from the CWER distribution at a particular CCDF value to a hard limit of a low-density parity-check (LDPC) decoder of the processing device.

5. The system of claim 1, wherein the plurality of blocks are programmed to the one or more dies around a same time and temperature, and wherein each respective voltage offset bin of the plurality of voltage offset bins is associated with a die family of the plurality of dies.

6. The system of claim 1, wherein the updated assignments to the plurality of voltage offset bins are tracked within a bin histogram, and wherein the operations further comprise, during age-testing of the plurality of dies, training the machine learning TR model by correlating a bit error count (BEC) distribution of each of the plurality of dies with the bin histogram to generate quantiles of the CWER distribution that vary based on time after program.

7. The system of claim 6, wherein the training of the machine learning TR model further comprises:

labeling a CWER value of each of a plurality of training read samples, generated from each respective die, with an erase count (PEC) value, an assigned voltage offset bin, and a complementary cumulative distribution function (CCDF) value associated with the respective block family;

training a multi-layer neural network using the labeled CWER values; and storing a plurality of weights and bias values that characterize the trained multi-layer neural network.

8. The system of claim 7, wherein the operations further comprise normalizing the plurality of weights and the bias values using a combination of:

one or more first TR-BEC values associated with lowest BEC percentiles determined without a delay between assigning a voltage offset bin and reading the voltage offset bin; and one or more second TR-BEC values associated with delayed BEC percentiles corresponding to reading the voltage offset bin after a delay.

9. A method comprising:

causing, by a processing device, a health scan to be performed on a block family of a plurality of block families of a memory device that comprises a plurality of dies, wherein the block family comprises a plurality of blocks residing within one or more dies of the plurality of dies;

updating, for each read sample taken during the health scan of the block family, an assignment of a voltage offset bin of a plurality of voltage offset bins;

providing the updated assignments to the plurality of voltage offset bins to a machine learning trigger rate (TR) model;

receiving, from the machine learning TR model, a code word error rate (CWER) distribution of the memory device; and in response to determining that a TR margin value associated with the CWER distribution does not satisfy a threshold value, causing, by the processing device, a data associated with the block family to be refreshed.

10. The method of claim 9, wherein, in response to predicting that the TR margin value associated with the CWER distribution satisfies the threshold value, the method further comprising executing the machine learning TR model with a new set of updated assignments of the read samples to the plurality of voltage offset bins.

11. The method of claim 9, wherein the CWER distribution comprises a complementary cumulative distribution function (CCDF) of a bit error count of the plurality of dies, and wherein the CCDF of the bit error count is predictive of a likelihood of data retention past a particular time after program of the data.

12. The method of claim 11, wherein the method further comprises determining the TR margin value as a distance from the CWER distribution at a particular CCDF value to a hard limit of a low-density parity-check (LDPC) decoder of the processing device.

13. The method of claim 9, wherein the plurality of blocks are programmed to the one or more dies around a same time and temperature, and wherein each respective voltage offset bin of the plurality of voltage offset bins is associated with a die family of the plurality of dies.

14. The method of claim 9, wherein the updated assignments to the plurality of voltage offset bins are tracked within a bin histogram, and wherein the method further comprises, during age testing of the plurality of dies, training the machine learning TR model by correlating a bit error count (BEC) distribution of each of the plurality of dies with the bin histogram to generate quantiles of the CWER distribution that vary based on time after program.

15. The method of claim 14, wherein the training of the machine learning TR model further comprises:

labeling a CWER value of each of a plurality of training read samples, generated from each respective die, with a program-erase count (PEC) value, an assigned voltage offset bin, and a complementary cumulative distribution function (CCDF) value associated with the respective block family;

training a multi-layer neural network using the labeled CWER values; and storing a plurality of weights and bias values that characterize the trained multi-layer neural network.

16. The method of claim 15, further comprising normalizing the plurality of weights and the bias values using a combination of:

one or more first TR-BEC values associated with lowest BEC percentiles determined without a delay between assigning a voltage offset bin and reading the voltage offset bin; and one or more second TR-BEC values associated with delayed BEC percentiles corresponding to reading the voltage offset bin after a delay.

17. A non-transitory computer-readable storage medium storing instructions, which when executed by a processing device coupled to a memory device of a memory subsystem, causes the processing device to perform operations comprising:

causing a health scan to be performed on a block family of a plurality of block families of a memory device that comprises a plurality of dies, wherein the block family comprises a plurality of blocks residing within one or more dies of the plurality of dies;

updating, for each read sample taken during the health scan of the block family, an assignment of a voltage offset bin of a plurality of voltage offset bins;

providing the updated assignments to the plurality of voltage offset bins to a machine learning trigger rate (TR) model;

receiving, from the machine learning TR model, a code word error rate (CWER) distribution of the memory device; and in response to determining that a TR margin value associated with the CWER distribution satisfies a threshold value, executing the machine learning TR model with a new set of updated assignments of the read samples to the plurality of voltage offset bins.

18. The non-transitory computer-readable storage medium of claim 17, wherein, in response to determining that the TR margin value associated with the CWER distribution does not satisfy the threshold value, the operations further comprise causing a data associated with the block family to be refreshed within the memory device.

19. The non-transitory computer-readable storage medium of claim 17, wherein the CWER distribution comprises a complementary cumulative distribution function (CCDF) of a bit error count of the plurality of dies, the CCDF of the bit error count is predictive of a likelihood of data retention past a particular time after program of the data, and wherein the operations further comprise predicting the TR margin value as a distance from the CWER distribution at a particular CCDF value to a hard limit of a low-density parity-check (LDPC) decoder of the processing device.

20. The non-transitory computer-readable storage medium of claim 17, wherein the plurality of blocks are programmed to the one or more dies around a same time and temperature, and wherein each respective voltage offset bin of the plurality of voltage offset bins is associated with a die family of the plurality of dies.

* * * * *